(No Model.)

W. BRADBROOK.
HOOF TRIMMER.

No. 355,756. Patented Jan. 11, 1887.

Witnesses.

Inventor,
Walter Bradbrook,
By Justus N. St. John,
His Atty.

UNITED STATES PATENT OFFICE.

WALTER BRADBROOK, OF DYSART, IOWA.

HOOF-TRIMMER.

SPECIFICATION forming part of Letters Patent No. 355,756, dated January 11, 1887.

Application filed April 16, 1886. Serial No. 199,147. (No model.)

*To all whom it may concern:*

Be it known that I, WALTER BRADBROOK, a citizen of the United States, residing at Dysart, in the county of Tama and State of Iowa, have invented certain new and useful Improvements in Hoof-Trimmers, of which the following is a specification.

The object of my invention is to render more easy, convenient, and expeditious the trimming of horses' hoofs preparatory to shoeing; and the invention consists in a device for holding the hoof with one hand, and, pivoted thereto, a suitable knife for paring the hoof with the other hand, as will be hereinafter fully set forth and described.

Figure 1:
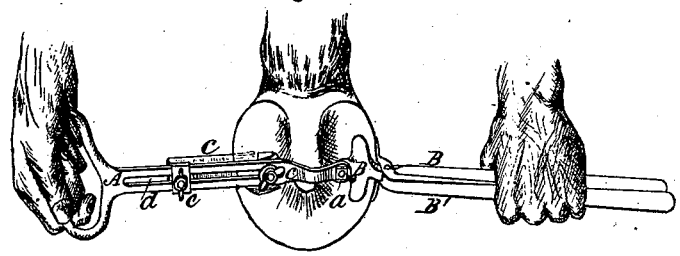
Figure 2:
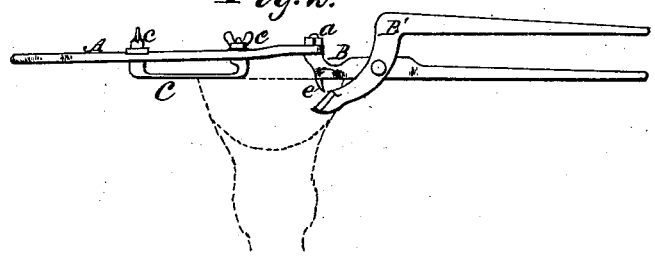
Figure 3:
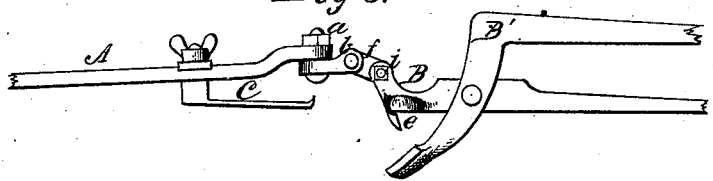
Figure 4:
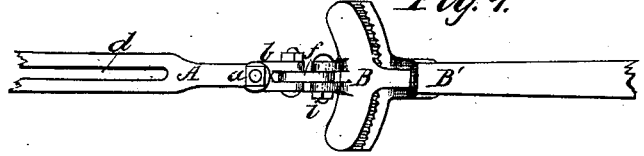

In the accompanying drawings, forming a part of this specification, Figure 1 represents a view of the invention in perspective as applied to the horse's hoof; Fig. 2, a side elevation of the same; Fig. 3, a similar view of a modified form of the device enlarged, and Fig. 4 a plan view of Fig. 3.

Similar letters of reference indicate corresponding parts.

The device, which is quite simple, as will be seen, consists, essentially, in a pair of tongs or grippers, B B', and a rotating knife, A C. In the construction of the tongs the jaws are preferably made wide, as represented, and the upper jaw, B, is provided with tangs $e$, to prevent the tongs from slipping off the side of the hoof. The lower jaw, B', should also be notched for the same purpose, and is made to conform to the angle and convexity of the hoof. The upper jaw is provided with a pivot, $a$, and to this is connected a knife adapted to turn in the same plane as the bottom of the hoof. The knife may be pivoted directly to the jaw B and terminate at the other end in a suitable handle; but in practice I prefer to attach it to a handle, A, permanently connected with the rest of the device. For convenience in the adjustment of the knife this handle is provided with a longitudinal slot, $d$, and the knife is fastened at any desired point by means of the thumbscrews $c$ $c$.

Various forms of knives may be applied to the same handle or shank, two styles being represented in the drawings. That shown in Figs. 1 and 2 is adapted to level off the hoof for the fitting of the shoe, and that in Fig. 3 to cut out a suitable cavity about the frog. To vary the angle of either of these knives or any other style that may be attached, the device may be provided with means for adjusting the pivot vertically, such as is represented in Fig. 3. The pivot-iron $b$ in this case is connected with the jaw by means of a link, $f$, which, by means of the bolt $i$, passing through one end and through the lugs of the jaw, may be fastened at any desired angle. The tool is thus adapted to any and all variations in the size and shape of the hoof.

The operation of the device will be apparent from the drawings. The hoof is grasped and held on one side by the tongs, and with the other hand the knife is drawn in a circular direction about the hoof. When one side has been trimmed, the position of the tool is reversed, and the other side is treated in the same manner. The result is a perfect trimming of the hoof in a shorter time than could be done by the common knife, and with but a small proportion of the labor involved in the old operation. Thus one of the most difficult and vexatious operations in the shoeing of horses is rendered comparatively easy and pleasant. Besides aiding in the trimming of the hoof, the device also assists materially in holding it in position, and this without any injury to the animal, so that the workman has a better control over the horse than ordinarily.

Having thus briefly described my invention, what I claim as new, and desire to secure by Letters Patent, is—

1. In a hoof-trimmer, the combination of the knife-shank A and the hoof-holding tongs composed of the part B, having pivot $a$ and tangs $e$ $e$, and the part B', the jaw of which corresponds with the angle and convexity of the hoof, substantially as and for the purpose specified.

2. In a hoof-trimmer, the combination of the described hoof-holding tongs having the pivot $a$, the adjustable knife C, and the knife-shank A, having the slot $d$, for the adjustment of the knife, substantially as set forth.

3. In a hoof-trimmer, the combination of the described hoof-holding tongs B B', the link $f$, pivot-iron $a$, tightening-bolt $i$, and knife-shank A, all substantially as and for the purpose set forth.

In testimony whereof I affix my signature in presence of two witnesses.

WALTER BRADBROOK.

Witnesses:
JOHN PURVIANCE,
D. D. HAMILTON.